Patented May 19, 1931

1,805,925

UNITED STATES PATENT OFFICE

KARL SCHMIDT, OF LEVERKUSEN, GERMANY, ASSIGNOR TO GENERAL ANILINE WORKS, INC., OF NEW YORK, N. Y., A CORPORATION OF DELAWARE

PROCESS FOR THE OXIDATION OF LEUCO COMPOUNDS OF THE TRIARYL METHANE SERIES

No Drawing. Application filed October 20, 1928, Serial No. 313,935, and in Germany October 28, 1927.

The present invention concerns the oxidation of leuco compounds of the triarylmethane series by treating the leuco compounds in solution of pyridine bases, such as pyridine or homologues thereof, quinoline and the like or mixtures of these bases, with oxygen, with the addition of a copper salt.

In accordance with the invention leuco compounds of dyestuffs of the triarylmethane series can easily be oxidized to the corresponding dyestuffs, by reacting upon the leuco compounds dissolved in a pyridine base, (such as pyridine, homologues or other substitution products thereof, quinoline, lepidine, etc.) with oxygen in the presence of a suitable organic or inorganic copper salt such as cupricchloride, -sulfate, -acetate, -formiate, -carbonate, -oxalate, cuprouschloride or the like, whereby it is to be understood that in the term oxygen also oxygen containing gases such as air are intended to be included. The reaction is advantageously performed at temperatures between about 80–120° C., the addition of suitable diluents such as water, methyl alcohol, ethyl alcohol, acetone, glycerine or the like being in some cases of advantage. The amount of copper salts to be added is a very small one, for instance 2% and less, (calculated upon the leuco compound), being operable in most cases.

When working in this manner oxidation performs in a very convenient manner and on a technical scale also in such cases, where other oxidation methods heretofore known are inoperable or only yield small amounts of the dyestuffs, which latter is, for instance, the case with the dyestuffs mentioned in the examples of this application.

The following examples illustrate my invention without limiting it thereto:

Example 1

20 grams of the leuco acid obtainable from vicinal meta xylidine and benzaldehyde-2.4-disulphonic acid according to usual methods are dissolved in 100 ccs. of pyridine and 5 ccs. of water and a solution of 0.7 grams of cupric chloride in 5 ccs. of water is added. The solution is stirred with an intensive stirrer while leading air through and heating to about 100° C. until the dyestuff has completely separated. After cooling the dyestuff is filtered and any adhering pyridine is removed with sodium chloride solution. The yield of the dyestuff, which probably corresponds to the formula:

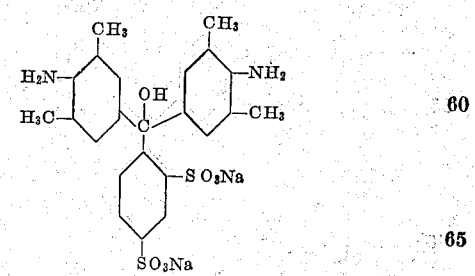

is almost quantitative. Instead of the cupric chloride other copper salts, such as for example, cuprous chloride, cupric sulphate or the like can be used.

The leuco acids obtainable from ortho toluidine and benzaldehyde-2.4-disulphonic acid or para xylidine and benzaldehyde-2.4-disulphonic acid can be oxidized equally satisfactorily following the above directions.

Example 2

20 grams of para leucaniline or the corresponding quantity of the mono-, di- or trichloro hydrate thereof are dissolved in 100 ccs. of pyridine and 0.7 grams of cupric chloride, dissolved in 5 ccs. of water, are added. The solution is treated as described in Example 1. As soon as the formation of the dyestuff is complete, the pyridine is distilled off in vacuo, the product is dissolved in dilute hydrochloric acid and the chlorohydrate of parafuchsine is precipitated with sodium chloride. The product is then purified by redissolving. The yield of dyestuff is very satisfactory. The pyridine can be replaced by homologues thereof, by quinoline or by mixtures of these bases. The dyestuff, thus obtainable, probably corresponds to the formula:

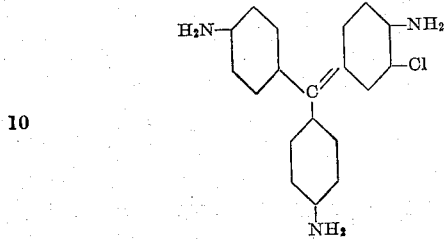

*Example 3*

20 grams of the leuco acid obtained from ortho cresotinic acid and benzaldehyde ortho sulphonic acid according to the usual methods are dissolved in 130 ccs. of pyridine with the addition of a little water. This solution, after the addition of 1 gram of cupric chloride is heated to 100° C. while stirring rapidly and leading air through until the oxidation is complete. After distilling off the pyridine the dyestuff is salted out from the acid solution. In this case part of the pyridine can also be replaced by gylcerine. The dyestuff, thus obtainable, probably corresponds in its free form to the formula:

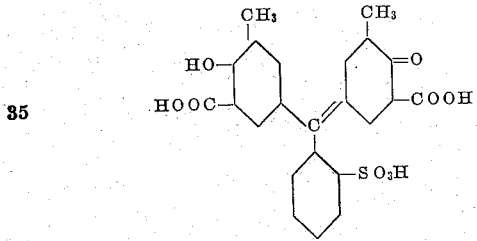

from vicinal meta xylidine and benzaldehyde-2.4-disulfonic acid, in pyridine and oxidizing the leuco compound in this solution with oxygen in the presence of copper chloride at a temperature of about 100° C.

In testimony whereof I have hereunto set my hand.

KARL SCHMIDT. [L. S.]

I claim:
1. Process which comprises dissolving a leuco compound of a dyestuff of the triarylmethane series in a pyridine base and oxidizing the leuco compound by means of oxygen in the presence of a suitable copper salt.

2. Process which comprises dissolving a leuco compound of a dyestuff of the triarylmethane series in a pyridine base and oxidizing the leuco compound at a temperature between about 80–120° C. by means of oxygen in the presence of a suitable copper salt.

3. Process which comprises dissolving a leuco compound of a dyestuff of the triarylmethane series in pyridine and oxidizing the leuco compound by means of oxygen in the presence of a suitable copper salt.

4. Process which comprises dissolving a leuco compound of a dyestuff of the triarylmethane series in pyridine and oxidizing the leuco compound at a temperature between about 80–120° C. by means of oxygen in the presence of a suitable copper salt.

5. Process which comprises dissolving the leuco compound of the leuco acid, obtainably